C. SCHMIDT.
FRAME FOR MOTOR VEHICLES.
APPLICATION FILED MAR. 10, 1905.
924,941.
Patented June 15, 1909.
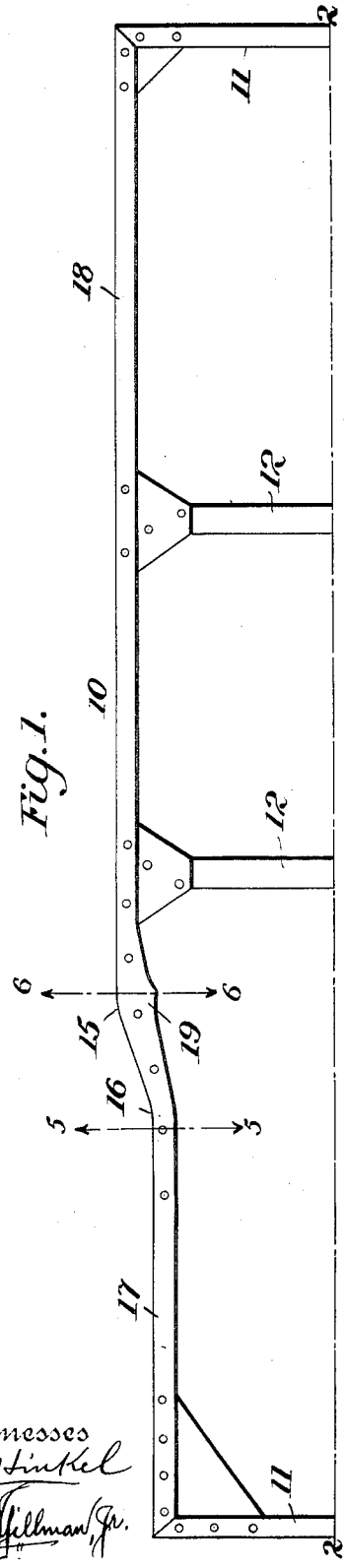
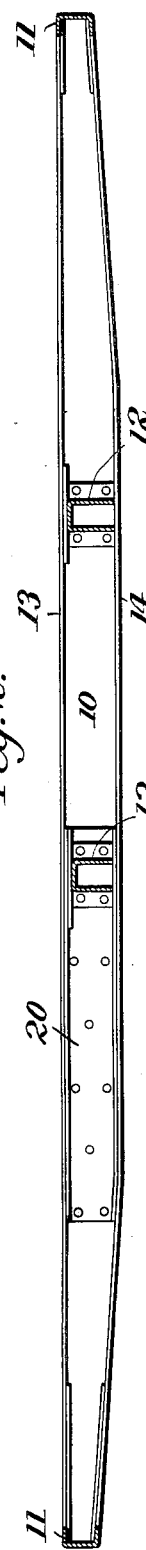
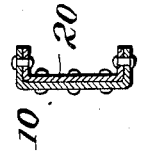
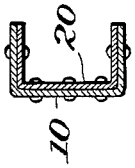
Witnesses
Inventor
Charles Schmidt
By Foster Freeman & Watson
Attorneys

UNITED STATES PATENT OFFICE.

CHARLES SCHMIDT, OF DETROIT, MICHIGAN, ASSIGNOR TO PACKARD MOTOR CAR COMPANY, OF DETROIT, MICHIGAN, A CORPORATION OF WEST VIRGINIA.

FRAME FOR MOTOR-VEHICLES.

No. 924,941.  Specification of Letters Patent.  Patented June 15, 1909.

Application filed March 10, 1905. Serial No. 249,442.

*To all whom it may concern:*

Be it known that I, CHARLES SCHMIDT, a citizen of France, residing at Detroit, in the county of Wayne, State of Michigan, have invented certain new and useful Improvements in Frames for Motor-Vehicles, of which the following is a specification.

This invention relates to improvements in motor vehicle frames and it consists in a frame in which each of the side bars has a reverse curve or offset and a reinforce coincident with said curve or offset whereby the frame is equally rigid throughout its length.

The invention will be described in connection with the accompanying drawing, in which, Figure 1 is a half plan view of a motor vehicle frame embodying the invention; Fig. 2 is a sectional view on the line 2—2 of Fig. 1; Figs. 3 and 4 are plan and side views of the reinforce, and Figs. 5 and 6 are sections respectively on the lines 5—5 and 6—6 of Fig. 1.

Referring to the drawing the frame consists of side bars 10, end bars 11 and transverse bars or braces 12. The side and end bars are of channel-section, having upper flanges 13 and lower flanges 14. They have preferably a uniform depth at the middle portion and taper toward the ends, as shown in Fig. 2, the lower flange 14 being preferably inclined upward while the upper flange 13 is horizontal. Toward one end of the frame the side bars are offset, being curved inward at 15 and outward at 16, the general contour being that of a reverse curve and the forward portion 17 being parallel with the rear portion 18. At the offset portion the upper and lower flanges of the side bars are increased in width as shown at 19 and the offset portion is reinforced by a corresponding piece or reinforce 20. The reinforce is preferably of channel-section of such size as to fit snugly within the side bar proper and having its flanges enlarged at the middle as shown at 21, to correspond with the enlargement 19 of the side bar flanges. The reinforce is suitably connected to the side bar by rivets. A frame thus constructed is practically of uniform strength throughout its length and is not weakened by the offset or reversely curved outline which is necessary to adapt it to the vehicle body.

Having described my invention what I claim and desire to secure by Letters Patent is, 1. A motor vehicle frame having its side bars reversely curved or offset as shown, each side bar having parallel front and rear portions and having upper and lower flanges which are wider at the offset portion than at the front and rear portions.

2. A motor vehicle frame comprising end bars and side bars having upper and lower flanges, the side bars having intermediate offset or reversely curved portions, and channeled reinforcing pieces secured to said side bars at the offset portions and between the upper and lower flanges thereof, the flanges being wider at the offset portions of the side bars than elsewhere, for the purpose set forth.

3. A motor vehicle frame comprising channeled side bars, the lower flanges of said side bars being inclined upwardly at each end and the upper flanges of said side bars being substantially horizontal, said side bars having offset portions intermediate their ends, and reinforcing pieces secured within the flanges of the side bars at the offset portions, the flanges being wider at the offset portions of the side bars than elsewhere, for the purpose set forth.

In testimony whereof I have signed my name to this specification in the presence of two subscribing witnesses.

CHARLES SCHMIDT.

Witnesses:
- RUSSELL HUFF,
- MARK C. TAYLOR.